United States Patent
Tan et al.

(10) Patent No.: US 10,029,372 B2
(45) Date of Patent: *Jul. 24, 2018

(54) CONTROL SYSTEM AND METHOD FOR BRAKE BLEEDING

(71) Applicant: General Electric Company, Schenectady, NY (US)

(72) Inventors: Huan Tan, Niskayuna, NY (US); John Michael Lizzi, Wilton, NY (US); Douglas Forman, Niskayuna, NY (US); Charles Burton Theurer, Alplaus, NY (US); Omar Al Assad, Niskayuna, NY (US); Mauricio Castillo-Effen, Niskayuna, NY (US); Romano Patrick, Atlanta, GA (US); Balajee Kannan, Niskayuna, NY (US); Yonatan Gefen, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 159 days.

This patent is subject to a terminal disclaimer.

(21) Appl. No.: 14/966,717

(22) Filed: Dec. 11, 2015

(65) Prior Publication Data

US 2017/0165839 A1 Jun. 15, 2017

(51) Int. Cl.
*G05B 19/04* (2006.01)
*G05B 19/18* (2006.01)
(Continued)

(52) U.S. Cl.
CPC ........... *B25J 9/1697* (2013.01); *B25J 9/1666* (2013.01); *B25J 11/00* (2013.01); *B25J 13/085* (2013.01);
(Continued)

(58) Field of Classification Search
CPC ...... B25J 13/085; B25J 19/021; B25J 9/1612; B25J 9/1661; B25J 9/1664
(Continued)

(56) References Cited

U.S. PATENT DOCUMENTS 8,509,971 B1 8/2013 Isailovski et al.
8,583,313 B2 11/2013 Mian
(Continued)

FOREIGN PATENT DOCUMENTS

CN 101830218 2/2012

OTHER PUBLICATIONS

Pauwels et al.; Real-Time Object Pose Recognition and Tracking with an Imprecisely Calibrated Moving RGB-D Camera; IEEE/RSJ International Conference on Intelligent Robots and Systems; Sep. 14-18, 2014; pp. 2733-2740.
(Continued)

*Primary Examiner* — Harry Y Oh
(74) *Attorney, Agent, or Firm* — GE Global Patent Operation; Pabitra Chakrabarti (57) ABSTRACT

A system includes a machine assembly, an imaging sensor, an encoder, and one or more processors. The machine assembly is movable to actuate a brake lever of a vehicle in order to open a valve of an air brake system of the vehicle. The imaging sensor acquires perception information of a working environment that includes the brake lever. The encoder detects a displaced position of the machine assembly relative to a reference position of the machine assembly. The one or more processors detect a position of the brake lever relative to the machine assembly based on the acquired perception information and the detected displacement of the arm. The one or more processors generate a motion trajectory for the machine assembly that provides a path to the brake lever. The one or more processors drive movement of the machine assembly along the motion trajectory towards the brake lever.

20 Claims, 4 Drawing Sheets

(51) Int. Cl.
　　*B25J 9/16*　　　　(2006.01)
　　*B60T 15/54*　　　(2006.01)
　　*B61H 13/02*　　　(2006.01)
　　*B25J 13/08*　　　(2006.01)
　　*B25J 11/00*　　　(2006.01)
　　*B25J 15/00*　　　(2006.01)
　　*B25J 19/02*　　　(2006.01)
　　*B60T 7/16*　　　　(2006.01)
　　*B60T 15/04*　　　(2006.01)

(52) U.S. Cl.
　　CPC ............ *B25J 15/00* (2013.01); *B25J 19/021* (2013.01); *B60T 7/16* (2013.01); *B60T 15/048* (2013.01); *B60T 15/54* (2013.01); *B61H 13/02* (2013.01); *Y10S 901/01* (2013.01)

(58) Field of Classification Search
　　USPC ......................................................... 700/253
　　See application file for complete search history.

(56) References Cited

U.S. PATENT DOCUMENTS

| | | | |
|---|---|---|---|
| 9,083,861 B2 | 7/2015 | Haas et al. | |
| 9,085,080 B2 | 7/2015 | Mian | |
| 9,186,795 B1* | 11/2015 | Edsinger | ............... B25J 9/1694 |
| 2005/0195409 A1* | 9/2005 | Watanabe | .............. B25J 9/1697 |
| | | | 356/614 |
| 2008/0027580 A1* | 1/2008 | Zhang | ................... B25J 9/1633 |
| | | | 700/245 |
| 2008/0033410 A1* | 2/2008 | Rastegar | ................ A61B 18/20 |
| | | | 606/9 |
| 2010/0076631 A1* | 3/2010 | Mian | .................... G05D 1/0229 |
| | | | 701/19 |
| 2012/0004774 A1* | 1/2012 | Umetsu | .................... B25J 5/007 |
| | | | 700/254 |
| 2013/0083188 A1 | 4/2013 | Mian et al. | |
| 2014/0163730 A1* | 6/2014 | Mian | ......................... B25J 9/16 |
| | | | 700/248 |
| 2014/0343767 A1 | 11/2014 | Oswald et al. | |
| 2015/0008294 A1 | 1/2015 | Desbordes et al. | |
| 2015/0094855 A1* | 4/2015 | Chemouny | .......... G05B 19/423 |
| | | | 700/259 |
| 2015/0164361 A1* | 6/2015 | Lunner | .................. H04R 25/02 |
| | | | 600/379 |
| 2016/0089789 A1* | 3/2016 | Sato | ....................... B25J 11/005 |
| | | | 700/254 |

OTHER PUBLICATIONS

Wu et al.; Cloud-Based Networked Visual Servo Control; IEEE Transactions on Industrial Electronics; Feb. 2013; vol. 60, Issue 2, pp. 554-566.

* cited by examiner

CONTROL SYSTEM AND METHOD FOR BRAKE BLEEDING

FIELD

The subject matter described herein relates to systems that bleed brakes of a vehicle, such as air brakes of a vehicle.

BACKGROUND

Some vehicles include brake systems that operate based on pressure differentials in fluid disposed in the brake systems. For example, air brakes in some vehicles (e.g., rail vehicles) may disengage when the air pressure in the air brakes is decreased. The air brakes in such vehicles may be released in certain environments in order to perform operations on the vehicles. The air brakes in rail vehicles, for example, may be disengaged while in a rail yard in order to more freely roll the rail vehicles around within the rail yard.

In order to disengage the air brakes of vehicles, a human operator may pull on a lever that opens a valve of the air brakes. The valve is opened and the air within the brake system is bled (e.g., the air flows out of the brake system) to reduce the pressure within the brake system and disengage the air brakes. Use of human operators in a rail yard, however, is not without problems. The operations taking place in a rail yard pose safety risks to the human operators. Additionally, the use of human operators can involve increased cost relative to automated systems.

But, automated systems pose problems as well. Although applicant is unaware of any automated system that can bleed air brakes of a vehicle, such an automated system that pulls on a brake lever to disengage a brake system may be unreliable due to the wide variances in the brake systems among several different vehicles. For example, different vehicles may have brake levers in different locations that may be difficult for the automated system to locate, may have brake levers that require different amounts of force to actuate, may have other components that block movement of the automated system when attempting to access and pull the brake lever, may have brake levers that become temporarily stuck, etc. These variances can make it difficult for an automated system to perform brake bleeding operations.

BRIEF DESCRIPTION

In an embodiment, a system (e.g., a control system for brake bleeding) is provided that includes a machine assembly, an imaging sensor, an encoder, and one or more processors. The machine assembly is movable to actuate a brake lever of a vehicle in order to open a valve of an air brake system of the vehicle. The imaging sensor is positioned to acquire perception information of a working environment that includes the brake lever. The encoder detects a displacement of the machine assembly relative to a reference position of the machine assembly. The one or more processors are configured to detect a position of the brake lever relative to the machine assembly based on the perception information and the displacement of the machine assembly. The one or more processors are further configured to generate a motion trajectory for the machine assembly that provides a path from the machine assembly to the position of the brake lever. The one or more processors drive movement of the machine assembly along the motion trajectory towards the brake lever.

In another embodiment, a method (e.g., a method for brake bleeding) is provided that includes acquiring perception information to detect a position of a brake lever of a vehicle relative to an arm of a machine assembly. The brake lever is actuatable to open a valve of an air brake system of the vehicle. The perception information is acquired by an imaging sensor mounted on the arm. The method includes generating, using one or more processors, a motion trajectory for the arm from a current position of the arm to the position of the brake lever. The motion trajectory includes a series of via-points that form a path for the arm to move along towards the brake lever while avoiding identified obstacles. The method also includes generating, using the one or more processors, designated torques for the arm at corresponding via-points based on the motion trajectory. The method further includes driving the arm towards the brake lever according to the designated torques to actuate the brake lever for opening the valve of the air brake system.

In another embodiment, a system (e.g., a control system for brake bleeding) is provided that includes a machine assembly, an imaging sensor, an encoder, and one or more processors. The machine assembly has an arm and a base. The arm is movable relative to the base to actuate a brake lever of a vehicle in order to open a valve of an air brake system of the vehicle. The imaging sensor is mounted on the arm. The imaging sensor acquires three-dimensional perception information of a working environment that includes the brake lever. The encoder detects a displacement of the arm relative to a reference position of the arm on the machine assembly. The one or more processors are configured to detect a position of the brake lever relative to the arm based on the three-dimensional perception information and the displacement of the arm. The one or more processors are further configured to generate a motion trajectory for the arm that provides a path from the arm to the position of the brake lever. The one or more processors drive movement of the arm along the motion trajectory towards the brake lever.

BRIEF DESCRIPTION OF THE DRAWINGS

The inventive subject matter described herein will be better understood from reading the following description of non-limiting embodiments, with reference to the attached drawings, wherein below.

DETAILED DESCRIPTION

Reference will be made below in detail to example embodiments of the inventive subject matter, examples of which are illustrated in the accompanying drawings. Wherever possible, the same reference numerals used throughout the drawings refer to the same or like parts. Although embodiments of the inventive subject matter are described with respect to vehicles and vehicle systems such as trains, locomotives, and other rail vehicles, embodiments of the inventive subject matter are also applicable for use with vehicles generally, such as off-highway vehicles (e.g., vehicles that are not designed or permitted to travel on public roadways), agricultural vehicles, and/or transportation vehicles, each of which may include a brake system.

The act of bleeding a brake system, also referred to herein as brake bleeding, using an automated system may risk substantial detection errors for the automated system to locate and then actuate the target object, which may be a brake lever. For example, there may be detection errors in locating the brake lever in the working environment in addition to control errors occurring as the automated system moves towards the detected location of the brake lever. If the error is too large, the automated system may not engage the brake lever or may engage the brake lever at a wrong location or orientation such that the automated system does not properly actuate the brake lever, resulting in insufficient bleeding of the brake system. Furthermore, the automated system may have to make several attempts to locate, engage, and actuate a single brake lever before the air is released from the brake system, which can consume a significant amount of time and resources.

The systems and methods described herein can be used to actuate a brake release action. An automated system implements closed loop control of a robotic arm to locate and actuate a brake lever to bleed a brake system. For example, even with a detection error that is relatively large, such as 2-4 cm, the error decreases as the robotic arm approaches the brake lever due to closed loop feedback from one or more sensors. These sensors can include, but are not limited to, an imaging sensor installed on a robotic arm that moves the brake lever, a force and/or torque sensor installed on the robotic arm, and/or position feedback of the robotic arm (e.g., encoders that sense displacement of the arm). A computer, such as a controller, reads the sensor inputs and provides the following outputs based on the inputs: the location of the brake lever relative to the robotic arm, the current position and movement of the robotic arm, and/or the forces and/or torques applied by the arm. The sensors provide the outputs to the computer as the robotic arm moves, and updated information is used to revise or adjust the movement of the robotic arm towards the brake lever, reducing the error between the position of the arm and the position of the brake lever. Thus, the arm is controlled more precisely to reduce instances of the arm failing to bleed a brake system on a first attempt.

Figure 1:
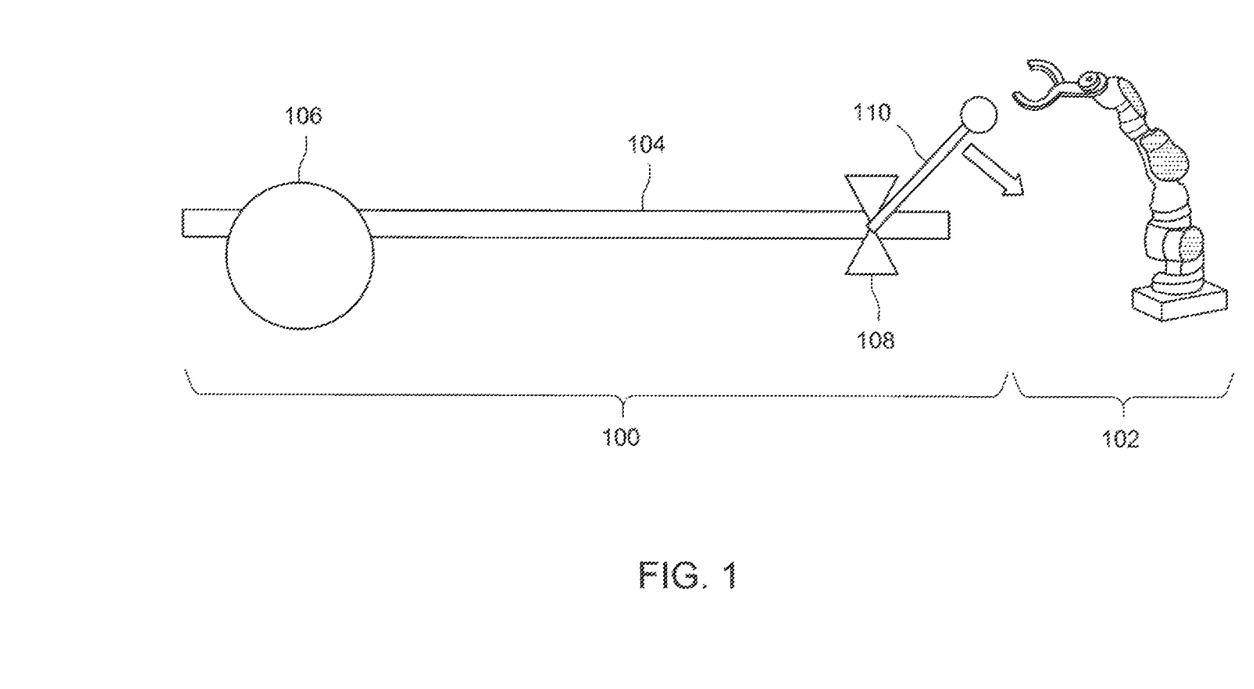
FIG. 1 schematically illustrates a brake system and a robotic control system according to one embodiment.

FIG. 1 schematically illustrates a brake system 100 and a robotic control system 102 according to one embodiment. The brake system 100 may be disposed onboard one or more vehicles, such as rail vehicles, automobiles, or the like. The brake system 100 operates on a pressure differential within one or more conduits 104 of the brake system 100. When the pressure of a fluid, such as air, in the conduits 104 is above a designated threshold or when the pressure increases by at least a designated amount, the brake system 100 engages brakes 106 (e.g., air brakes) of the brake system 100. Although only one brake 106 is shown in FIG. 1, the brake system 100 may include several brakes 106.

The conduit 104 is connected with a valve 108 that closes to retain the fluid within the conduit 104. The valve 108 can be opened to release (e.g., bleed) the fluid out of the conduit 104 and brake system 100. Once the pressure of the fluid in the conduit 104 and brake system 100 drops by or below a designated amount, the brakes 106 of the brake system 100 release. The vehicle having the brake system 100 may then freely roll with the brakes 106 being disengaged.

The valve 108 can be actuated by moving a brake lever 110. The brake lever 110 can be pulled or pushed (e.g., actuated) to open the valve 108. Releasing the brake lever 110 may cause the valve 108 to close. For example, the brake lever 110 may move under the force of a spring to return to a starting position and force the valve 108 closed.

In another embodiment, the brake lever 110 may require an operator or an automated system to return the brake lever 110 to the starting position to close the valve 108 after bleeding the brake system 100.

The brake system 100 may be mounted on one vehicle of a vehicle system that includes a plurality of interconnected vehicles for traveling together along a route. Optionally, all or at least most of the vehicles in the vehicle system include a brake system similar to the brake system 100. Prior to the vehicle system starting to move from a stationary position, the brake systems of each of the vehicles need to be bled. In accordance with one embodiment of the inventive subject matter described herein, the robotic control system 102 is mobile and is configured to move among the vehicle system from vehicle to vehicle. At each vehicle, the robotic control system 102 recognizes and locates the applicable brake lever 110, moves toward the brake lever 110, engages the brake lever 110, and actuates the brake lever 110 to bleed the brakes. Once it is determined that the valve 108 has been opened to release the brakes 106, the robotic control system 102 disengages the brake lever 110 and moves to the next vehicle in the vehicle system to repeat the brake bleeding process. The robotic control system 102 may implement one or more follow up actions responsive to determining that the brake system 100 has or has not been disengaged, such as by communicating with one or more human operators, attempting to release the brake system 100 again, identifying the vehicle having the brake system 100 as requiring inspection, maintenance, or repair, etc.

Figure 2:
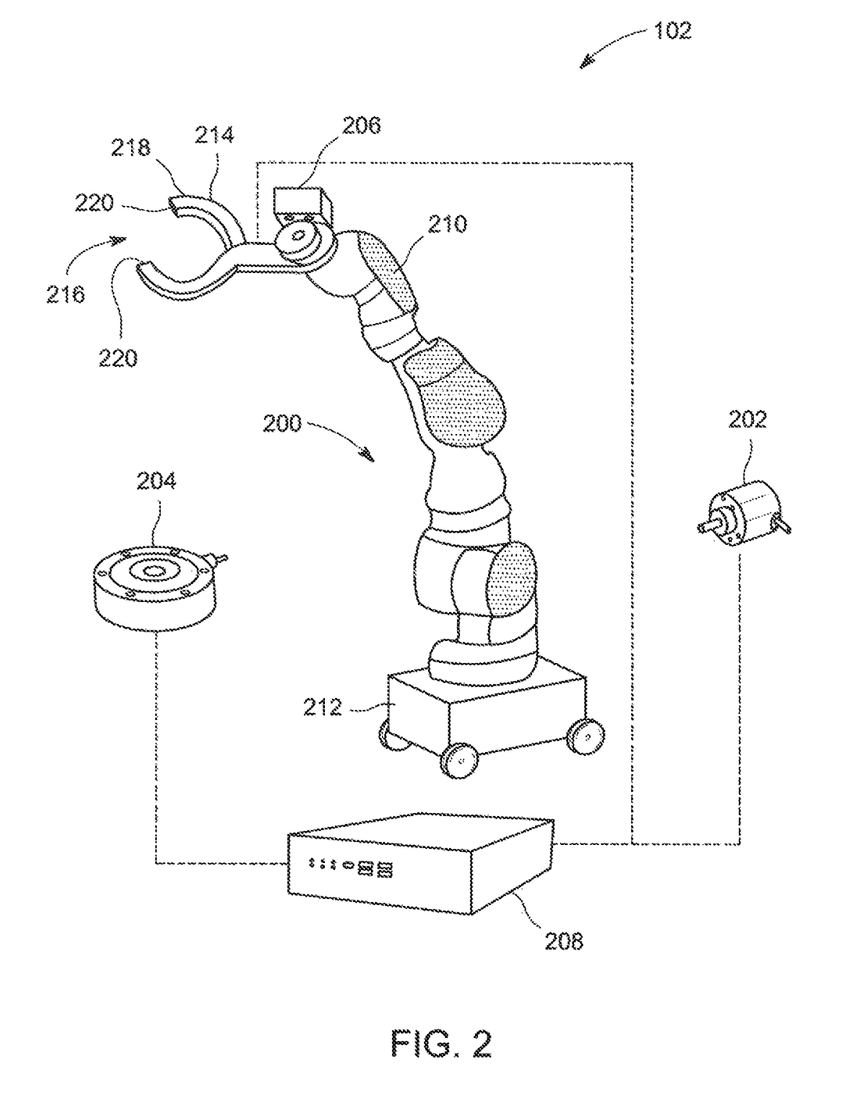
FIG. 2 illustrates one embodiment of the robotic control system shown in FIG. 1.

FIG. 2 illustrates one embodiment of the robotic control system 102 shown in FIG. 1. The control system 102 includes a robotic machine assembly 200 that moves under the direction of a controller 208. In the illustrated embodiment, the assembly 200 represents a robotic arm 210 that is mounted on a mobile base 212. The mobile base 212 transports the arm 210 from vehicle to vehicle. The arm 210 moves in multiple different directions relative to the base 212 under the control of the controller 208. The controller 208 drives the arm 210 to move toward the corresponding brake lever 110 (shown in FIG. 1) to engage (for example, grasp) the brake lever 110 and actuate the brake lever 110 to release the brakes 106 (FIG. 1) of the vehicle. For example, the controller 208 may convey commands in the form of electrical signals to actuators, motors, and/or other devices of the assembly 200 that provide a kinematic response to the received commands.

The controller 208 represents hardware circuitry that includes, represents, and/or is connected with one or more processors (e.g., microprocessors, field programmable gate arrays, integrated circuits, or other electronic logic-based devices). The controller 208 may include and/or be communicatively connected with one or more memories, such as computer hard drives, computer servers, etc. The controller 208 is communicatively coupled with the assembly 200 by one or more wired and/or wireless connections that allow the controller 208 to dictate how and where the assembly 200 moves.

The control system 102 includes one or more sensors 202, 204, 206 that detect operational parameters of the assembly 200 and/or the brake system 100 (shown in FIG. 1). These operational parameters are communicated to the controller 208, which can examine the parameters to determine the location of the brake lever 110 (shown in FIG. 1) relative to the assembly 200 and drive the assembly 200 to move along a defined path towards the brake lever 110 while avoiding obstacles between the assembly 200 and the brake lever 110. In the illustrated example, the control system 102 includes an encoder sensor 202 that converts rotary and/or linear positions of the arm 210 to one or more electronic signals. The encoder sensor 202 can include one or more transducers that generate the electronic signals as the arm 210 moves. The electronic signals can represent displacement and/or movement of the arm 210, such as a position, velocity, and/or acceleration of the arm 210 at a given time. The position of the arm 210 may refer to a displaced position of the arm 210 relative to a reference position of the arm 210, and the displacement may indicate how far the arm 210 has moved from the reference position.

The arm 210 includes an end-effector 214 at a distal end 216 of the arm 210 (relative to the mobile base 212). The end-effector 214 is configured to engage the brake lever 110 (shown in FIG. 1) during the brake bleeding process to physically actuate the lever 110. For example, the end-effector 214 may grasp the brake lever 110 to hold the lever such that translation of the arm 210 moves the brake lever 110. In the illustrated embodiment, the end-effector 214 has a jaw 218 that is controllable to adjust the width of the jaw 218 between two fingers 220 that are movable relative to each other. The jaw 218 may be controlled for the fingers 220 to engage and at least partially enclose the brake lever 110.

The robotic control system 102 includes an imaging sensor 206 that is installed on the arm 210 of the machine assembly 200. In an embodiment, the imaging sensor 206 is mounted on or at least proximate to the end-effector 214. For example, the imaging sensor 206 includes a field of view that encompasses at least a portion of the end-effector 214. The imaging sensor 206 therefore moves towards the brake lever 110 as the arm 210 moves toward the brake lever 110. The imaging sensor 206 is proximate to the brake lever 110 when the end-effector 214 engages the brake lever 110. The imaging sensor 206 acquires three-dimensional perception information of a working environment of the arm 210. The three-dimensional perception information includes images and/or video of the brake lever 110 in the working environment. More specifically, the three-dimensional perception information includes red, green, blue (RGB) data and depth data for mapping or modeling the working environment. For example, the imaging sensor 206 may include an infrared (IR) emitter that generates and emits a pattern of IR light into the environment, and a depth camera that analyzes the pattern of IR light to interpret perceived distortions in the pattern. The imaging sensor 206 may also include one or more color cameras that operate in the visual wavelengths. The three-dimensional perception information acquired by the imaging sensor 206 is communicated to the controller 208 and used by the one or more processors to identify the brake lever 110 and determine the location of the brake lever 110 relative to the arm 210. The imaging sensor 206 may acquire the perception information at an acquisition rate of at least 15 Hz, such as approximately 30 Hz. Optionally, the imaging sensor 206 may be a Kinect™ sensor manufactured by Microsoft.

The control system 102 can include a force sensor 204 that detects forces and/or torques applied by the arm 210 to the brake lever 110. The force sensor 204 may communicate electronic signals to the controller 208 that represent the sensed forces and/or torques applied by the arm 210. The sensed forces and/or torques may represent forces applied by the jaw 218 of the end effector 214 on the brake lever 110. The sensed forces and/or torques may also represent torques applied at various joints of the arm 210 for moving and maneuvering the arm 210. Optionally, the control system 102 may include one or more additional or other sensors. For example, the control system 102 may include an acoustic sensor that detects sounds generated during actuation of the brake lever 110 to determine whether the brake lever 110 has been actuated to release the brake system 100.

Figure 3:
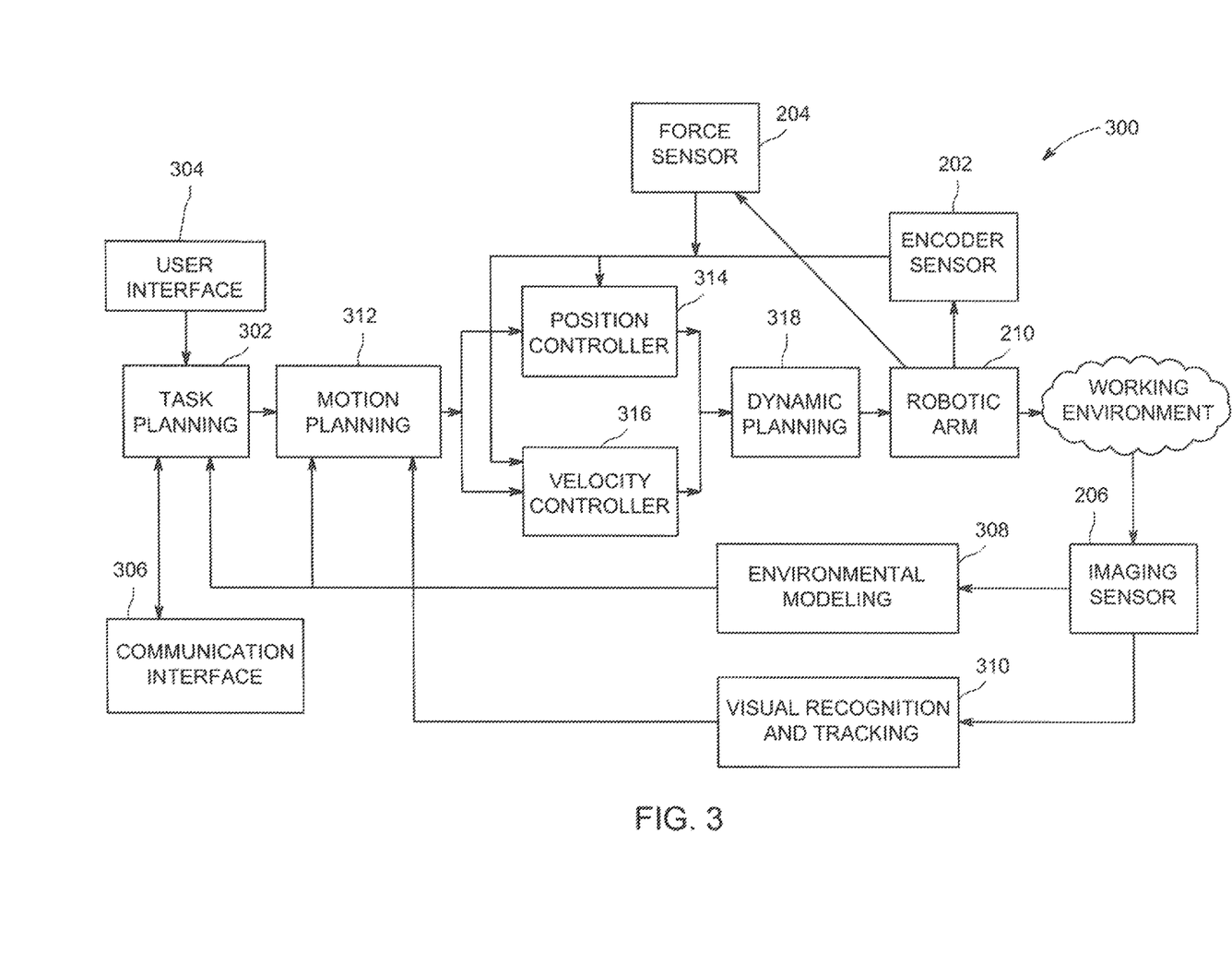
FIG. 3 illustrates a block diagram of the robotic control system according to one embodiment.

FIG. 3 is a block diagram 300 of the robotic control system 102 (shown in FIG. 1) according to one embodiment. The block diagram 300 illustrates how the devices of the control system 102 interact to automatically locate and engage a brake lever to bleed the brakes of a vehicle. A task planning processor 302 receives a task for the control system 102 to perform, such as to bleed the brakes of all or a selection of vehicles of an identified vehicle system. The task may be received from either a user interface 304 or a communication interface 306. The task may be input by an operator using the user interface 304 (for example, a graphical user interface) which may include a touchpad, a touchscreen, keys, buttons, knobs, or the like. The task alternatively may be received via the communication interface 306 from a remote operator or system. The communication interface 306 may operate based on a wireless communication protocol. In addition to sending tasks to the task planning processor 302, the user interface 304 and/or the communication interface 306 may be used by the control system 102 to send messages to an operator or another system. The outgoing messages may include status updates, warnings and other alerts, and the like.

The task planning processor 302 plans the performance of the designated task by scheduling task primitives. The task primitives may be a sequence of sub-tasks, such as move machine assembly 200 (shown in FIG. 2) to vehicle, extend arm 210 toward brake lever 110 (FIG. 1), grasp brake lever 110, pull brake lever 110, verify brakes 106 (FIG. 1) are released, push brake lever 110, release brake lever 110, retract arm 210, and the like.

An environmental modeling processor 308 describes the working space or environment of the robotic arm 210. The environmental modeling processor 308 receives sensory perception information from the imaging sensor 206. The environmental modeling processor 308 may analyze the three-dimensional perception information to construct a point cloud-based map of the working environment, which provides relatively high precision. The environmental modeling processor 308 may use the constructed map to identify a location of the brake lever 110, as well as locations of any obstacles between the arm 210 and the brake lever 110. For example, a first set of points in the point cloud-based map may be associated with the brake lever 110, a second set of points may be associated with an obstacle, and a third set of points may be associated with free space. The output of the environmental modeling processor 308, such as the location of the brake lever 110, may be communicated to the task planning processor 302 and/or to a motion planning processor 312. For example, the perception information may be provided as closed-loop feedback to the task planning processor 302 after the arm 210 has started moving toward the brake lever 110, and the perception information is used to validate that the task is complete (for example, the brakes have been released).

A visual recognition and tracking processor 310 may work in conjunction with the environmental modeling processor 308 to locate the brake lever 110 in the working environment. The visual recognition and tracking processor 310 receives the sensory perception information from the imaging sensor 206. In some known control systems, perception information is acquired at relatively high frequencies, but the processing of the visual information is slow, which slows the entire control system. In an embodiment, the visual recognition and tracking processor 310 uses a cascade processing sequence to increase the processing speed when the arm 210 is moving. In a first stage of the cascade processing sequence, the visual recognition and tracking processor 310 performs two-dimensional image processing on the acquired perception information to identify at least one target area in the image that potentially includes the brake lever 110. This first stage may be performed prior to and/or during movement of the arm 210 towards the brake lever 110. In a subsequent second stage of the cascade processing sequence, the visual recognition and tracking processor 310 performs three-dimensional image segmentation on the at least one target area. The three-dimensional image segmentation uses the point cloud-based data provided by the environmental modeling processor 308 to segment the target area to more precisely locate the brake lever 110. The three-dimensional segmentation may also provide more precise detail about the brake lever 110, such as the size, shape, and orientation of the brake lever 110. This second stage may be performed prior to and/or during movement of the arm 210.

By performing the three-dimensional segmentation on the identified one or more target areas, and not on other areas outside of the target area(s), the overall detection rate (including both image acquisition and image processing) is increased relative to known control systems that do not use the two-stage cascade processing sequence. The fast detection rate is used to track the location of the brake lever 110 as the arm 210 moves to provide closed loop feedback that reduces the error between the arm 210 and the lever 110. The visual recognition and tracking processor 310 communicates its output, the location of the brake lever 110, to the motion planning processor 312.

The motion planning processor 312 is configured to determine a smooth and collision-free motion trajectory in the working environment for the robotic arm 210 to extend towards and actuate the brake lever 110. The motion planning processor 312 receives the position of the brake lever 110 and the positions of any obstacles from the environmental modeling processor 308 and/or the visual recognition and tracking processor 310. For example, the position of the brake lever 110 may be received from the visual recognition and tracking processor 310, and the positions of any obstacles is received from the environmental modeling processor 308. The motion planning processor 312 analyzes the received information to generate the motion trajectory as a sequence of via-points that define a path for the arm 210 towards the lever 110. Each via-point may be computed with temporal information and motion information (including position, velocity, and acceleration) of the arm 210 at each via-point. The motion trajectory may be computed by combining attraction to the position of the brake lever 110 in the three-dimensional field and repulsion from the positions of the obstacles.

In order to reduce the error between the arm 210 and the brake lever 110 as the arm 210 moves along the motion trajectory, the motion planning processor 312 is configured to revise the motion trajectory based on updated positions of the brake lever 110 and the obstacles received from the environmental modeling processor 308 and/or the visual recognition and tracking processor 310 during movement of the arm 210. Optionally, the motion planning processor 312 may generate a revised motion trajectory periodically, such as once every half second, once every second, or once every two seconds. Planning in the motion trajectory may be limited to the succeeding ten or so via-points to avoid unnecessary computing for each revised motion trajectory.

By revising the motion trajectory during movement of the arm 210 towards the lever 110, the robotic control system 102 (shown in FIG. 1) provides closed-loop feedback and control to increase the precision of the arm 210 relative to the brake lever 110.

A position controller 314 receives the motion trajectory from the motion planning processor 312. The position controller 314 analyzes the motion trajectory and generates position driving signals for the robotic arm 210 based on the motion trajectory. The driving signals control the arm 210 to follow the path defined by the motion trajectory. For example, the driving signals are configured to control movement of the arm 210 such that the arm 210, or a component thereof, passes through the designated via-points at the designated times with little error between the actual positions of the arm 210 and the desired positions (at the via-points). The position controller 314 optionally may use a control loop feedback mechanism, such as a proportional-integral-derivative (PID) controller, to reduce the error between the actual measured positions of the arm 210 and the desired positions at corresponding designated via-points. For example, the position controller 314 may adjust the process through the use of a manipulated variable to reduce the error.

A velocity controller 316 also receives the motion trajectory from the motion planning processor 312. The velocity controller 316 analyzes the motion trajectory and generates velocity driving signals for the robotic arm 210 based on the motion trajectory. The velocity driving signals control the velocity and acceleration of the arm 210 as the arm 210 is driven to follow the path defined by the motion trajectory. The velocity controller 316 may be configured to reduce error by using the computed error between the actual measured position of the arm 210 and the desired position at a designated via-point to generate a compensation signal. The velocity controller 316 uses both a desired velocity that is designated in the motion trajectory and the compensation signal to generate a velocity driving signal in order to control the velocity of the arm 210 to reduce the computed error. Although described separately, the position controller 314 and the velocity controller 316 may be combined in a unitary device hardware, such as components of the controller 208 (shown in FIG. 2).

A dynamic planning processor 318 receives the position driving signals from the position controller 314 and the velocity driving signals from the velocity controller 316. The dynamic planning processor 318 analyzes the position and velocity driving signals to generate torques on various joints of the robotic arm 210 to drive the motion of the arm 210. The dynamic planning processor 318 may generate the torques using a robotic dynamics model. In addition to, or instead of, using the position and velocity driving signals, the dynamic planning processor 318 may analyze the desired via-points in the motion trajectory to generate the torques. In an embodiment, the dynamic planning processor 318 provides hybrid motion and force planning that plans the motion of the arm 210 and forces applied by the arm 210 (for example, forces applied on the brake lever 110) simultaneously. For example, one torque generated by the dynamic planning processor 318 may be conveyed to a joint between two linear segments of the arm 210 to control the relative angle between the two linear segments, and a second torque may be conveyed concurrently to the end-effector 214 (shown in FIG. 2) to control the width of the jaw 218 (FIG. 2).

The dynamic planning processor 318 is configured to receive feedback from one or more sensors during movement of the arm 210, and adjusts the generated torques based on the feedback. For example, the dynamic planning processor 318 may receive position and velocity feedback from the encoder sensor 202 that is used to determine real-time locations of the arm 210. Force feedback may be provided, at least in part, by the force sensor 204. For example, based on an identified type of brake system 100 (shown in FIG. 1) and brake lever 110 (FIG. 1), the dynamic planning processor 318 may determine an expected amount of force and/or torque necessary to actuate the brake lever 110. If the force sensor 204 provides feedback that the arm 210 is required to apply a force and/or torque to the brake lever 110 that exceeds the expected amount by designated value or percentage, the dynamic planning processor 318 identifies a potential problem and takes corrective action. The corrective action may be to control the arm 210 to release the brake lever 110, return to a starting position, and then start the brake release process again by identifying the position of the brake lever 110. The additional force required to actuate the brake lever 110 may be due to misalignment, so starting the brake release task over again may yield better alignment between the arm 210 and the lever 110. The corrective action also may include emitting an audible and/or visual alert, communicating a notification to a remote operator via the communication interface 306, or the like.

Although the block diagram 300 illustrates the task planning processor 302, the motion planning processor 312, the environmental modeling processor 308, the visual recognition and tracking processor 310, and the dynamic planning processor 318 as separate components, one or more of these processors 312 may be combined in a single processing device, such as the controller 208 (shown in FIG. 2). For example, at least some of the processors 302, 312, 308, 310, and 318 may be embodied in a single physical processor within the controller 208, or may be embodied in two or more physical processors within the controller 208. Alternatively, at least some of the processors 302, 312, 308, 310, and 318 may be contained in separate devices, such that one or more of the processors 302, 312, 308, 310, and 318 are contained in one controller (for example, controller 208), and at least one other of the processors 302, 312, 308, 310, and 318 is contained in a different controller. It is recognized that one or more processors perform the information processing of the robotic control system 102 during the brake release procedure.

Figure 4:
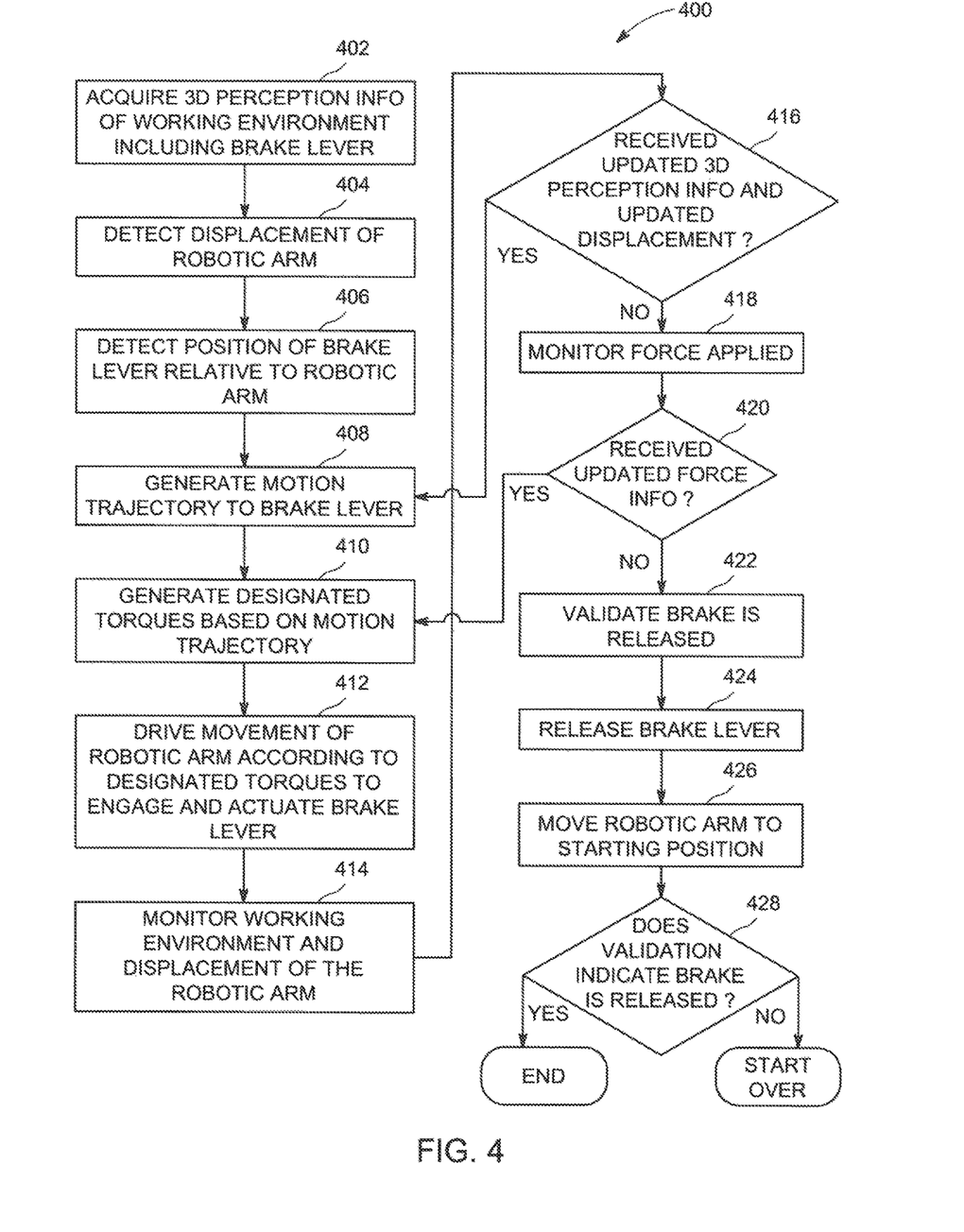
FIG. 4 a flowchart of one embodiment of a method for automatically locating and actuating a brake lever to perform brake bleeding.

FIG. 4 illustrates a flowchart of one embodiment of a method 400 for automatically locating and actuating a brake lever to perform brake bleeding. The method 400 may be performed by one or more embodiments of the control system 102 (shown in FIG. 1) described herein to release air brakes of a vehicle. At 402, three-dimensional perception information of a working environment is acquired. The three-dimensional perception information is acquired by an imaging sensor (for example, imaging sensor 206 shown in FIG. 2) that is mounted on a robotic arm of the control system 102, such that the imaging sensor moves with the robotic arm relative to a base of the control system on which the arm is mounted. The working environment includes a brake lever that is the target for the robotic arm in order to perform the brake bleeding. For example, the brake lever is actuatable to open valve of an air brake system of a vehicle. The imaging sensor may acquire the three-dimensional perception information at a relatively fast acquisition rate, such as a frequency of at least 15 Hz.

At 404, displacement of the robotic arm is detected. The displacement may refer to detecting a current, or displaced, position of the arm relative to a reference position of the arm. The displacement may be detected by an encoder sensor (for example, the encoder sensor 202 shown in FIG. 2). The displacement may include both position information and motion information about the arm, such as velocity and acceleration.

At 406, a position of the brake lever in the working environment is detected relative to the robotic arm. The relative position of the brake lever is detected by one or more processors using the three-dimensional perception information of the working environment and the displacement of the arm. The one or more processors detect the position of the brake lever at a detection rate, which refers to the rate that the position of the brake lever is detected and updated, and accounts for the acquisition of the perception information and the processing of the perception information. In an embodiment, in order to increase the detection rate, a two-stage processing sequence is implemented that first includes two-dimensional image processing on the perception information to identify at least one target area within the working environment that potentially includes the brake lever. The next stage in the sequence is three-dimensional image segmentation of the at least one target area without performing the image segmentation on one or more areas outside of the at least one target area. Therefore, three-dimensional image segmentation is only performed using a portion of the perception information, which increases the processing speeds and the overall detection rate.

At 408, a motion trajectory is generated that defines a path for the robotic arm to the brake lever. The motion trajectory is generated by one or more processors. The motion trajectory may be a series of via-points between the arm and the brake lever, and the motion trajectory may include dynamics values associated with each of the via-points. The dynamics values may include desired position, velocity, and acceleration of the robotic arm at the corresponding via-points. The motion trajectory also accounts for identified obstacles in the working environment between the arm and the brake lever, such that the via-points define a path that extends around any obstacles, allowing the arm to avoid engaging such obstacles. The presence of any obstacles may be detected by analyzing the three-dimensional perception information.

At 410, designated torques for joints of the robotic arm are generated based on the motion trajectory. The torques are generated by one or more processors. Some designated torques are directed to joints between linear segments of the robotic arm to control rotation and/or the relative angle between the linear segments. Other designated torques are directed to an end-effector that is configured to engage the brake lever to actuate the brake lever. The torques to the end-effector may control rotation of the end-effector, a width of a jaw of the end-effector for grasping the brake lever, and/or translational movement of the end-effector relative to other parts of the arm. The torques are generated such that the arm moves through the working environment according to the motion trajectory.

At 412, movement of the robotic arm is driven according to the designated torques. The movement of the arm may be driven by a controller. The arm is driven through the working environment to the brake lever such that the end-effector engages the brake lever. The arm is further driven by the torques such that the arm grasps the brake lever and pulls (or pushes) the lever to actuate the lever. The actuation of the lever releases air from the brake system to release the brakes. In an embodiment, the controller drives the movement of the robotic arm towards the lever at a control rate that is between 10 and 20 Hz. The control rate may be approximately equal to the detection rate. The controller drives the arm using the designated torques with the intent that the arm moves along the path defined in the motion trajectory. However, control error may cause the actual position of the arm at a given time to be slightly different than a desired via-point at that time designated by a via-point. The method 400 is configured to reduce control error by providing closed-loop feedback, as described below.

At 414, as the robotic arm is moving towards the brake lever, the working environment and the displacement of the robotic arm are both monitored. For example, the imaging sensor continues to acquire three-dimensional perception information of the working environment that includes the brake lever therein. As the imaging sensor on the robotic arm gets closer to the brake lever, the perception information acquired by the imaging sensor may provide a more detailed view of the brake lever compared to perception information acquired when the imaging system was farther away from the brake lever. Similarly, the encoder continues to detect the displacement of the robotic arm as the robotic arm moves towards the brake lever. The perception information and the displacement information are both communicated to one or more processors.

At 416, it is determined whether the one or more processors have received updated three-dimensional perception information and updated displacement information during movement of the robotic arm. If so, flow of the method 400 may return to 408 and a revised motion trajectory may be generated based on the updated information. Detection error is the difference between the calculated location of the brake lever using the perception information and the actual location of the brake lever. The revised motion trajectory has a reduced detection error relative to the original motion trajectory because the update perception information used to generate the revised motion trajectory is more accurate due to the increased proximity of the imaging sensor to the brake lever. Thus, the control system 102 includes closed-loop feedback that improves the accuracy of the control system 102.

After generating the revised motion trajectory, flow may continue through the described steps. For example, revised torques may be generated based on the revised motion trajectory, and these torques are used to drive the movement of the robotic arm during further movement of the arm towards the brake lever. The control system 102 may receive updated perception information and updated displacement information multiple times as the arm moves toward the brake lever. The motion trajectory may be revised multiple times, but the motion trajectory is not revised with the same frequency that the perception information is acquired. For example, to reduce unnecessary processing, the motion trajectory may be revised between one and five times during a single extension of the arm to a brake lever.

If updated perception information and updated displacement information is not received, flow continues to 418 and the force applied by the robotic arm is monitored as the arm moves. The force may be monitored by a force sensor (for example, force sensor 204 shown in FIG. 2) that is operably coupled to the arm. The force sensor may monitor forces on the joints of the arm, including forces applied by the arm on the brake lever when the arm engages the brake lever. At 420, a determination is made whether updated force information has been received. For example, the force sensor may real-time, closed-loop feedback to the one or more processors indicating the forces applied by the arm. If updated force information is received, flow of the method 400 may return to 410, where at least some of the designated torques are revised based on the updated force information. The one or more processors may also use updated displacement information from the encoder sensor to revise the designated torques. For example, if the force sensor and the encoder indicate that a given torque causes the arm to move farther in an advance direction than is desired in the motion trajectory, the one or more processors may revise subsequent designated torques to compensate for this identified control error. Thus, a subsequent torque may drive the arm in a direction opposite the advance direction to bring the position of the arm back to the defined path. Feedback provided by the force sensor may also be used to validate whether the brakes have been properly released.

At 422, brake release is validated. Brake release validation includes verifying that the valve of the air brake system has been sufficiently opened such that a sufficient amount of air has been released from the brake system to allow the brakes to move to a released state. Validation may be accomplished by various methods, including audibly recording the release of air, detecting movement of the brakes to the release state, monitoring a pressure in a conduit of the brake system, using the encoder to detect that the arm has moved the lever to a designated location, using the force sensor to detect the force exerted on the lever, and the like. For example, a given type of brake lever (identified by manufacturer, size, product number, etc.) may be associated with a range of forces to actuate the lever. During the brake release process, if the force sensor records that the brake lever moves in response to a force that is within the range, this is an indication that the brake is released. If, on the other hand, the force sensor indicates that the brake lever has not moved upon receiving a force at the top of the range, this is an indication that the brake is not released and/or the robotic arm is not accurately positioned relative to the brake lever. For example, the end-effector may have grasped the wrong part of the brake lever or the wrong lever entirely.

At 424, the robotic arm releases the brake lever. At 426, the robotic arm moves to a starting position. The starting position may be a retracted position relative to a mobile base of the control system. In the starting position, the robotic arm may be moved to another vehicle. At 428, a determination is made whether the validation indicates that the brake has been released. If the validation indicates that the brake has been released, flow of the method 400 ends. For example, the robotic arm may be moved to another vehicle to perform the brake bleeding task again. If instead the validation indicates that the brake has not been released properly, flow of the method 400 may start over, returning to 402 to acquire new three-dimensional perception information of the working environment. Optionally, the control system 102 may provide an alert or notification to an operator or system. The control system 102 may send the alert right away or after another failed attempt to bleed the brakes of the vehicle.

In an embodiment, a system is provided that includes a machine assembly, an imaging sensor, an encoder, and one or more processors. The machine assembly is movable to actuate a brake lever of a vehicle in order to open a valve of an air brake system of the vehicle. The imaging sensor is positioned to acquire perception information of a working environment that includes the brake lever. The encoder detects a displaced position of the machine assembly relative to a reference position of the machine assembly. The one or more processors are configured to detect a position of the brake lever relative to the machine assembly based on the perception information that is acquired and the displacement of the arm that is detected. The one or more processors are further configured to generate a motion trajectory for the machine assembly that provides a path from the displaced position of the machine assembly to the position of the brake lever. The one or more processors drive movement of the machine assembly along the motion trajectory towards the brake lever.

In an aspect, the system further includes a force sensor operably coupled to the machine assembly. The force sensor detects one or more forces generated by the machine assembly as the machine assembly actuates the brake lever.

In an aspect, the machine assembly includes a moveable arm that has an end-effector disposed at a distal end of the movable arm. The end-effector grasps the brake lever to actuate the brake lever. The imaging sensor is mounted on the movable arm at least one of on or proximate to the end-effector.

In an aspect, the imaging sensor acquires the perception information at a frequency of at least 15 Hz.

In an aspect, the one or more processors drive movement of the machine assembly at a control rate that is between 10 and 20 Hz.

In an aspect, the one or more processors detect the position of the brake lever relative to the machine assembly at a detection rate. The one or more processors drive movement of the machine assembly at a control rate that is approximately equal to the detection rate.

In an aspect, the one or more processors are configured to detect the position of the brake lever relative to the machine assembly by performing two-dimensional image processing on the perception information acquired by the imaging sensor to identify at least one target area that potentially includes the brake lever, and then performing three-dimensional image segmentation on the at least one target area.

In an aspect, the one or more processors are configured to analyze the perception information to detect the presence of one or more obstacles between the machine assembly and the brake lever. The one or more processors generate the motion trajectory such that the path for the machine assembly towards the brake lever avoids the one or more obstacles.

In an aspect, the one or more processors generate the motion trajectory as a series of via-points between the machine assembly and the brake lever. The motion trajectory includes dynamics values for position, velocity, and acceleration of the machine assembly associated with each via-point. The one or more processors are configured to drive the machine assembly through the via-points with the dynamics values at each corresponding via-point.

In an aspect, the machine assembly includes a movable arm having multiple joints and, subsequent to planning the motion trajectory, the one or more processors are configured to generate designated torques for corresponding joints of the arm. The one or more processors drive the arm of the machine assembly according to the designated torques.

In an aspect, the system further includes a force sensor on the machine assembly that detects one or more forces generated by the machine assembly acting to actuate the brake lever. The one or more processors are configured to revise the designated torques as the machine assembly is driven based on feedback received from the encoder and the force sensor.

In an aspect, the imaging sensor acquires perception information corresponding to the position of the brake lever relative to the machine assembly as the machine assembly is driven towards the brake lever. The one or more processors are configured to generate a revised motion trajectory for the machine assembly based on the perception information that is acquired as the machine assembly moves toward the brake lever.

In another embodiment, a method is provided that includes acquiring perception information to detect a position of a brake lever of a vehicle relative to an arm of a machine assembly. The brake lever is actuatable to open a valve of an air brake system of the vehicle. The perception information is acquired by an imaging sensor mounted on the arm. The method includes generating, using one or more processors, a motion trajectory for the arm from a current position of the arm to the position of the brake lever. The motion trajectory includes a series of via-points that form a path for the arm to move along towards the brake lever while avoiding identified obstacles. The method also includes generating, using the one or more processors, designated torques for the arm at corresponding via-points based on the motion trajectory. The method further includes driving the arm towards the brake lever according to the designated torques to actuate the brake lever for opening the valve of the air brake system.

In an aspect, the method further includes receiving arm displacement information from an encoder as the arm moves according to the motion trajectory, and revising the designated torques based on the arm displacement information that is received.

In an aspect, the method further includes receiving force generation information from a force sensor as the arm actuates the brake lever, and revising the designated torques based on the force generation information that is received.

In an aspect, the method further includes revising the motion trajectory based on updated perception information acquired by the imaging sensor during movement of the arm towards the brake lever.

In an aspect, the position of the brake lever relative to the arm is detected by performing two-dimensional image processing on the perception information acquired by the imaging sensor to identify at least one target area that potentially includes the brake lever, and then performing three-dimensional image segmentation on the at least one target area without performing the three-dimensional image segmentation on one or more areas outside of the at least one target area.

In another embodiment, a system is provided that includes a machine assembly, an imaging sensor, an encoder, and one or more processors. The machine assembly has an arm and a base. The arm is movable relative to the base to actuate a brake lever of a vehicle in order to open a valve of an air brake system of the vehicle. The imaging sensor is mounted on the arm. The imaging sensor acquires three-dimensional perception information of a working environment that includes the brake lever. The encoder detects a displaced position of the arm relative to a reference position of the arm on the machine assembly. The one or more processors are configured to detect a position of the brake lever relative to the arm based on the three-dimensional perception information that is acquired and the displacement of the arm that is detected. The one or more processors are further configured to generate a motion trajectory for the arm that provides a path from the displaced position of the arm to the position of the brake lever. The one or more processors drive movement of the arm along the motion trajectory towards the brake lever.

In an aspect, the arm includes an end-effector at a distal end of the arm. The end-effector is configured to grasp the brake lever. The imaging sensor is mounted at least one of on or proximate to the end-effector.

In an aspect, the system further includes a force sensor operably coupled to the machine assembly. The force sensor detects one or more forces generated by the arm as the arm actuates the brake lever.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to those of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable any person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods for communicating data in a vehicle consist, without departing from the spirit and scope of the inventive subject matter herein involved, it is intended that all of the subject matter of the above description or shown in the accompanying drawings shall be interpreted merely as examples illustrating the inventive concept herein and shall not be construed as limiting the inventive subject matter.

What is claimed is:

1. A system comprising:
a machine assembly that is movable to actuate a brake lever of a vehicle in order to open a valve of an air brake system of the vehicle;
an imaging sensor comprising an infrared emitter configured to generate and emit a pattern of infrared light and a depth camera configured to analyze the pattern of infrared light to interpret perceived distortions in the pattern to acquire three-dimensional perception information of a working environment that includes the brake lever;
an encoder detecting a displacement of the machine assembly relative to a reference position of a robotic arm of the machine assembly;
one or more processors configured to detect a position of the brake lever relative to the machine assembly based on the perception information and the displacement of the machine assembly, the one or more processors further configured to generate a motion trajectory for the machine assembly that provides a path from the machine assembly to the position of the brake lever, wherein the robotic arm moves along the motion trajectory towards the brake lever, the one or more processors further driving movement of the machine assembly along the motion trajectory towards the brake lever and revising the motion trajectory during movement of the robotic arm towards the brake lever with closed-loop feedback of the three-dimensional perception information and
analyze the three-dimensional perception information to construct a point cloud-based map of a working environment that includes the brake lever to identify a location of the brake lever, wherein the point cloud-based map comprises a first set of points associated with the brake lever, a second set of points associated with an obstacle, and a third set of points associated with free space.

2. The system of claim 1, further comprising a force sensor configured to operate with the machine assembly and detect one or more forces generated by the machine assembly as the machine assembly actuates the brake lever.

3. The system of claim 1, wherein the machine assembly includes a moveable arm that has an end-effector disposed at a distal end of the movable arm, the end-effector grasping the brake lever to actuate the brake lever, the imaging sensor being mounted on the movable arm at least one of on or proximate to the end-effector.

4. The system of claim 1, wherein the imaging sensor acquires the perception information at a frequency of at least 15 Hz.

5. The system of claim 1, wherein the one or more processors drive movement of the machine assembly at a control rate that is between 10 and 20 Hz.

6. The system of claim 1, wherein the one or more processors detect the position of the brake lever relative to the machine assembly at a detection rate, the one or more processors driving movement of the machine assembly at a control rate that is equal to the detection rate.

7. The system of claim 1, wherein the one or more processors are configured to detect the position of the brake lever relative to the machine assembly by performing two-dimensional image processing on the perception information acquired by the imaging sensor to identify at least one target area that potentially includes the brake lever, and then performing three-dimensional image segmentation on the at least one target area.

8. The system of claim 1, wherein the one or more processors are configured to analyze the perception information to detect the presence of one or more obstacles between the machine assembly and the brake lever, the one or more processors generating the motion trajectory such that the path for the machine assembly towards the brake lever avoids the one or more obstacles.

9. The system of claim 1, wherein the one or more processors generate the motion trajectory as a series of via-points between the machine assembly and the brake lever, the motion trajectory including dynamics values for position, velocity, and acceleration of the machine assembly associated with each via-point, the one or more processors configured to drive the machine assembly through the via-points with the dynamics values at each corresponding via-point.

10. The system of claim 1, wherein the machine assembly includes a movable arm having multiple joints and, subsequent to planning the motion trajectory, the one or more processors are configured to generate designated torques for corresponding joints of the arm, the one or more processors driving the arm of the machine assembly according to the designated torques.

11. The system of claim 10, further comprising a force sensor on the machine assembly that detects one or more forces generated by the machine assembly acting to actuate the brake lever, wherein the one or more processors are configured to revise the designated torques as the machine assembly is driven based on feedback received from the encoder and the force sensor.

12. The system of claim 1, wherein the imaging sensor acquires perception information corresponding to the position of the brake lever relative to the machine assembly as the machine assembly is driven towards the brake lever, the one or more processors configured to generate a revised motion trajectory for the machine assembly based on the perception information that is acquired as the machine assembly moves toward the brake lever.

13. A method comprising:
acquiring three-dimensional perception information to detect a position of a brake lever of a vehicle relative to an arm of a machine assembly, the brake lever being actuatable to open a valve of an air brake system of the vehicle, the perception information being acquired by an imaging sensor mounted on the arm by generating and emitting a pattern of infrared light using an infrared emitter and analyzing the pattern of infrared light to interpret perceived distortions in the pattern using a depth camera;
generating, using one or more processors, a motion trajectory for the arm from a current position of the arm to the position of the brake lever, the motion trajectory including a series of via-points that form a path for the arm to move along towards the brake lever while avoiding identified obstacles;
generating, using the one or more processors, designated torques for the arm at corresponding via-points based on the motion trajectory;
driving the arm towards the brake lever according to the designated torques to actuate the brake lever for opening the valve of the air brake system;
revising the motion trajectory during movement of the arm towards the brake lever with closed-loop feedback of the three-dimensional perception information; and
analyzing the three-dimensional perception information to construct a point cloud-based map of a working environment that includes the brake lever to identify a location of the brake lever, wherein the point cloud-based map comprises a first set of points associated with the brake lever, a second set of points associated with an obstacle, and a third set of points associated with free space.

14. The method of claim 13, further comprising receiving arm displacement information from an encoder as the arm moves according to the motion trajectory, and revising the designated torques based on the arm displacement information that is received, the arm displacement information including at least one of position information or motion information of the arm during movement of the arm towards the brake lever.

15. The method of claim 13, further comprising receiving force generation information from a force sensor as the arm actuates the brake lever, and revising the designated torques based on the force generation information that is received.

16. The method of claim 13, further comprising revising the motion trajectory based on updated perception information acquired by the imaging sensor during movement of the arm towards the brake lever.

17. The method of claim 13, wherein the position of the brake lever relative to the arm is detected by performing two-dimensional image processing on the perception information acquired by the imaging sensor to identify at least one target area that potentially includes the brake lever, and then performing three-dimensional image segmentation on the at least one target area without performing the three-dimensional image segmentation on one or more areas outside of the at least one target area.

18. A system comprising:
a machine assembly having an arm and a base, the arm being movable relative to the base to actuate a brake lever of a vehicle in order to open a valve of an air brake system of the vehicle;
an imaging sensor mounted on the arm, wherein the imaging sensor comprises an infrared emitter configured to generate and emit a pattern of infrared light and a depth camera configured to analyze the pattern of infrared light to interpret perceived distortions in the pattern to acquire three-dimensional perception information of a working environment that includes the brake lever;
an encoder detecting a displacement of the arm relative to a reference position of the arm;
one or more processors configured to detect a position of the brake lever relative to the arm based on the three-dimensional perception information and the displacement of the arm, the one or more processors further configured to generate a motion trajectory for the arm that provides a path from the arm to the position of the brake lever, the one or more processors driving movement of the arm along the motion trajectory towards the brake lever, and revising the motion trajectory during movement of the arm towards the brake lever with closed-loop feedback of the three-dimensional perception information and analyze the three-dimensional perception information to construct a point cloud-based map of a working environment that includes the brake lever to identify a location of the brake lever, wherein the point cloud-based map comprises a first set of points associated with the brake lever, a second set of points associated with an obstacle, and a third set of points associated with free space.

19. The system of claim 18, wherein the arm includes an end-effector at a distal end of the arm, the end-effector configured to grasp the brake lever, the imaging sensor being mounted at least one of on or proximate to the end-effector.

20. The system of claim 18, further comprising a force sensor operably coupled to the machine assembly, the force sensor detecting one or more forces generated by the arm as the arm actuates the brake lever.

* * * * *